C. L. TALBOT.
DELIVERY VEHICLE.
APPLICATION FILED AUG. 9, 1915.
1,206,169.
Patented Nov. 28, 1916.
4 SHEETS—SHEET 3.
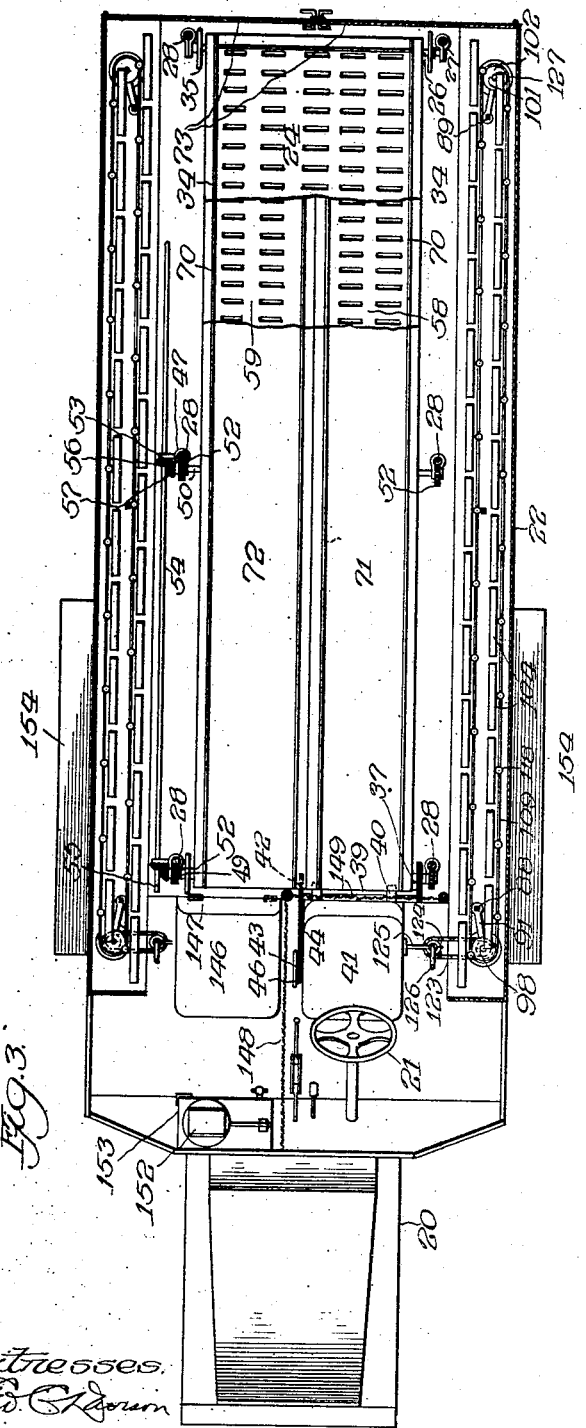
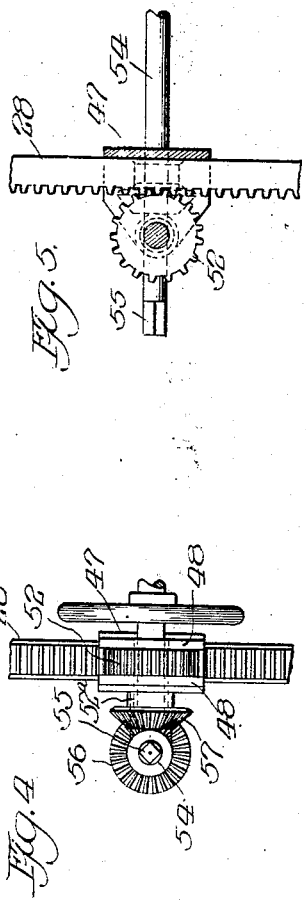
Witnesses.
Inventor:
Charles L. Talbot
By Walter M. Fuller
Atty.

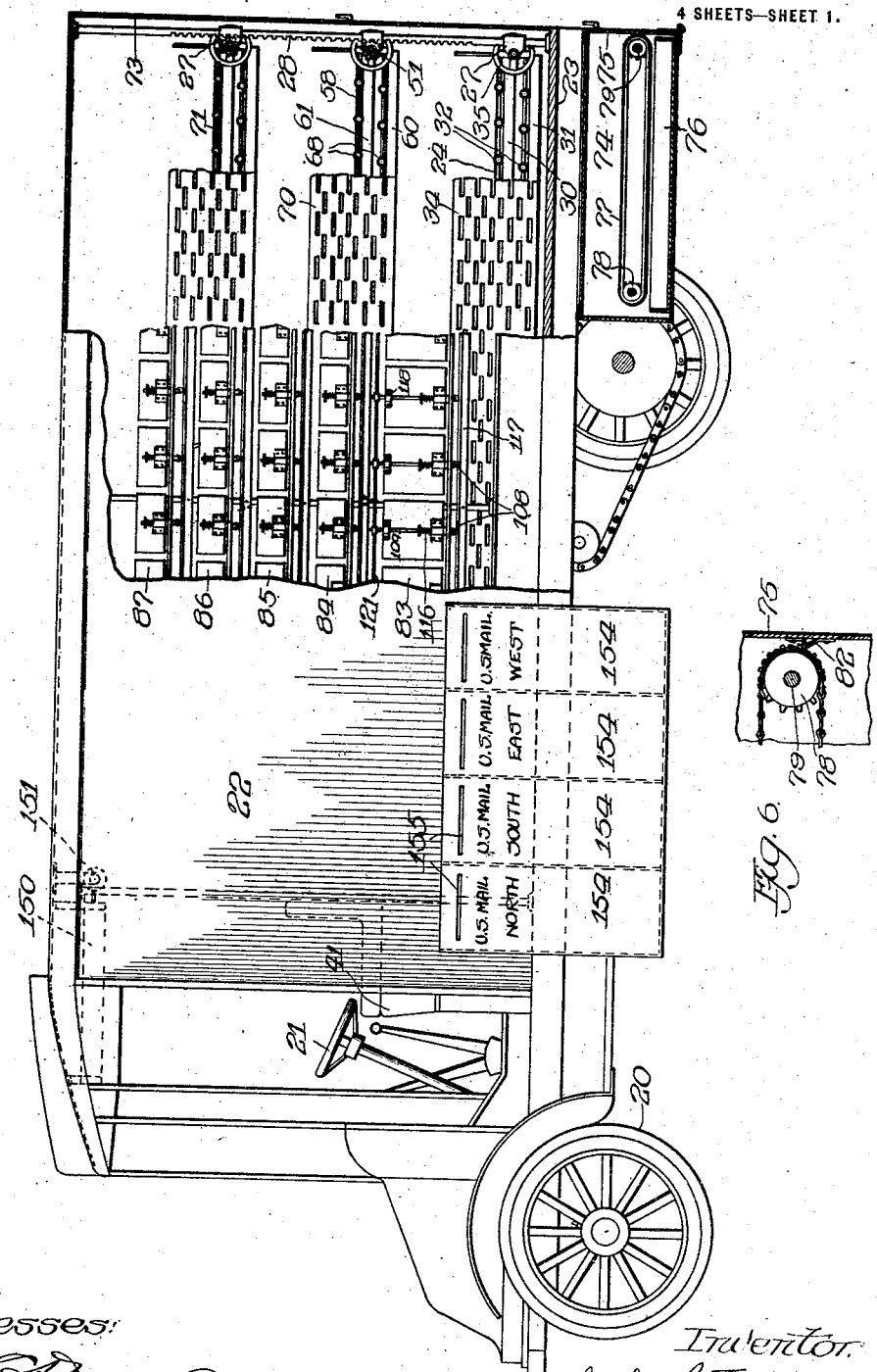

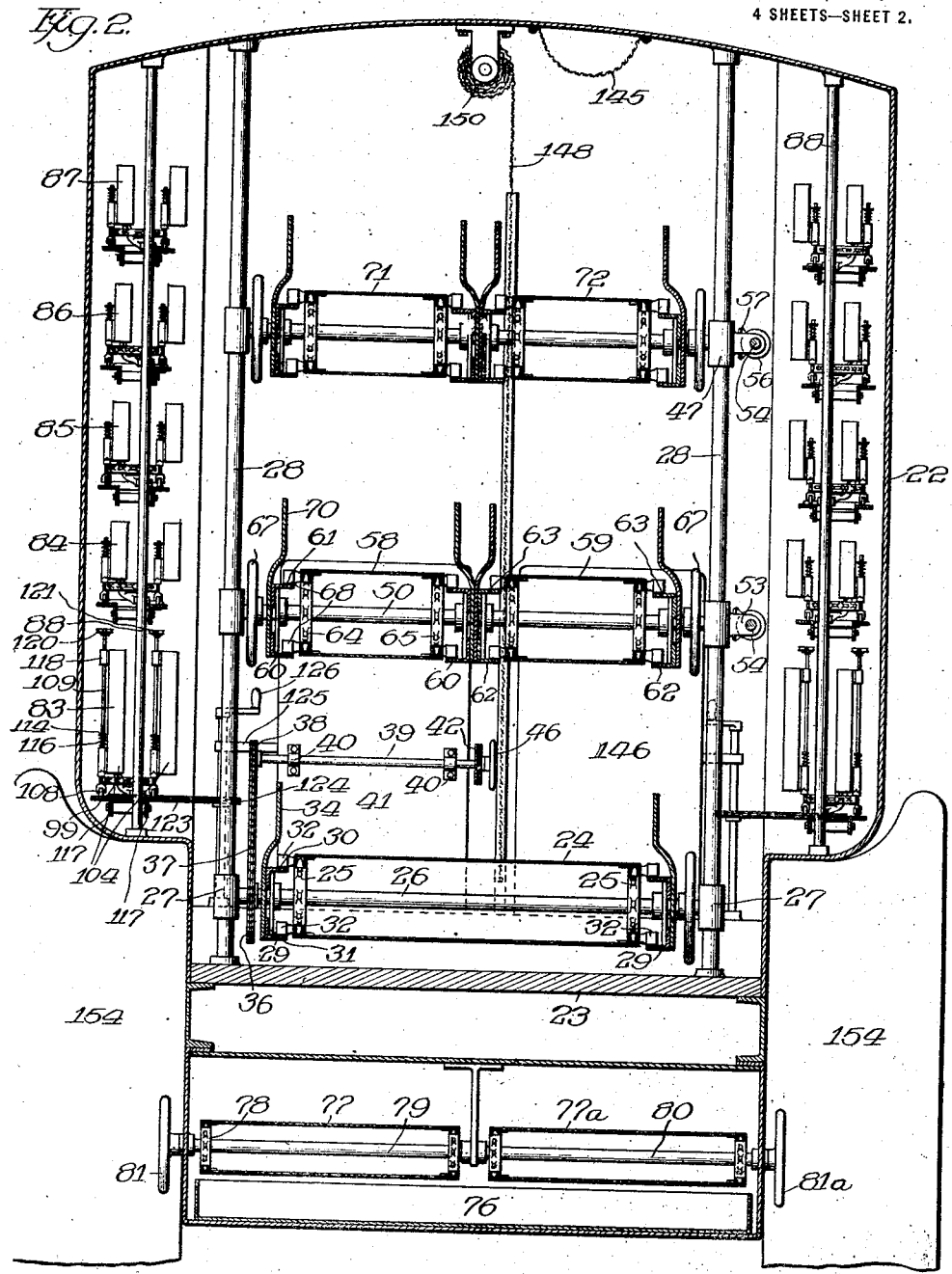

C. L. TALBOT.
DELIVERY VEHICLE.
APPLICATION FILED AUG. 9, 1915.
1,206,169.
Patented Nov. 28, 1916.
4 SHEETS—SHEET 4.
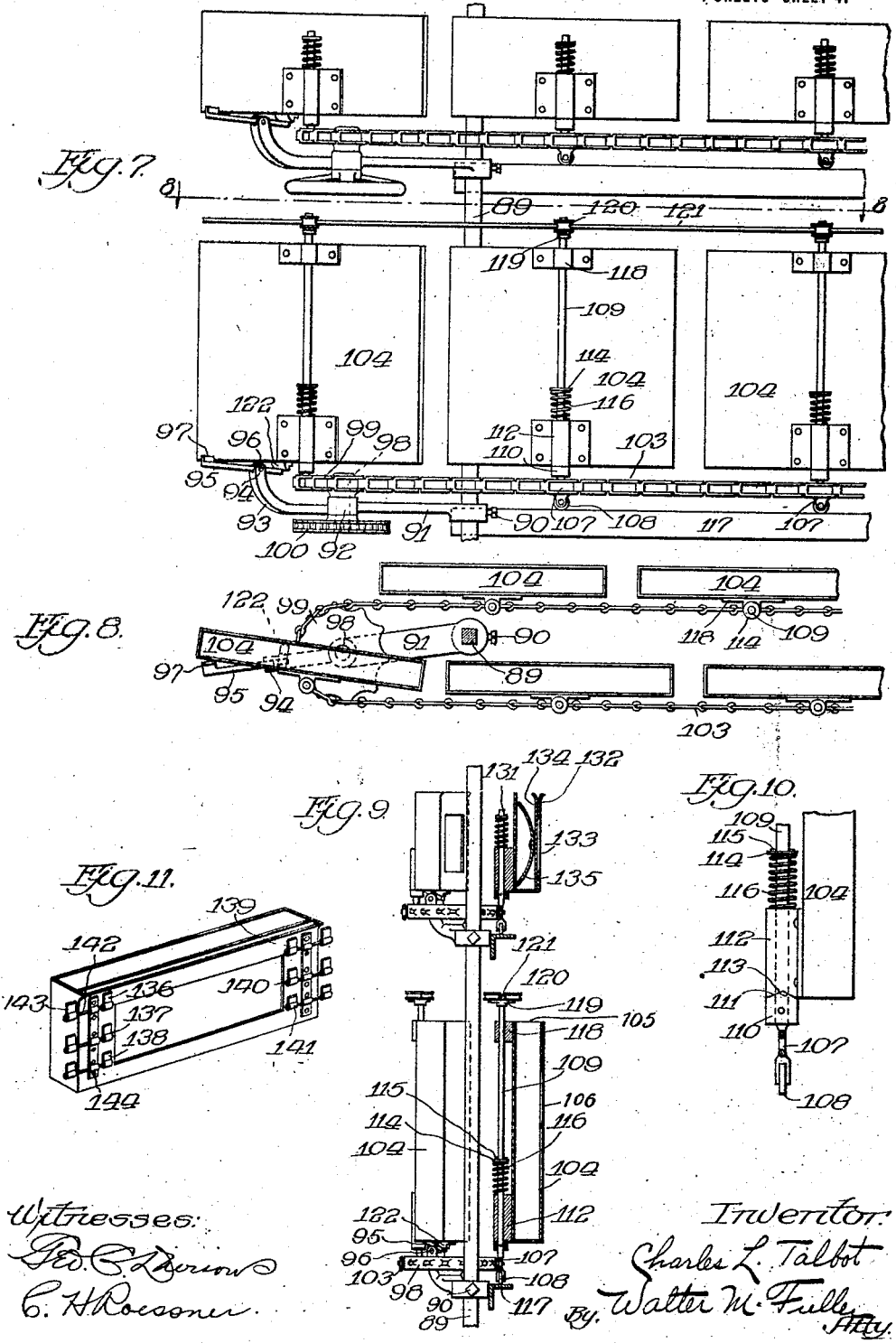

UNITED STATES PATENT OFFICE.

CHARLES L. TALBOT, OF CHICAGO, ILLINOIS.

DELIVERY-VEHICLE.

1,206,169.  Specification of Letters Patent.  Patented Nov. 28, 1916.

Application filed August 9, 1915. Serial No. 44,371.

*To all whom it may concern:*

Be it known that I, CHARLES L. TALBOT, a citizen of the United States, residing at Chicago, in the county of Cook and State of Illinois, have invented certain new and useful Improvements in Delivery-Vehicles, of which the following is a specification.

My invention pertains to improvements and features of novelty and advantage in vehicles for delivering or receiving parcels, letters, magazines and the like, or adapted for both delivery and reception of such articles.

Stated differently, the invention relates to vehicles adapted for use as delivery vehicles for stores and for employment in connection with a rural or city delivery and collection of postal letters or packages.

The leading objects of the invention are the provision of a vehicle or automobile of this general character, in which all of its available space may be employed for the accommodation of the goods handled and in which articles can be assorted and manipulated to effect the delivery or reception with the least expenditure of time and energy.

A further salient feature of the invention is the production of a vehicle of this character which shall be comparatively simple in structure, economical to manufacture, effective in operation and unlikely to become damaged or deranged in service.

Stated succinctly, one of the prime features of the invention is the provision of a vehicle of this general character which shall assist in the distribution and delivery of the articles and facilitate their reception and transportation.

In order that those skilled in this art may have a full and complete understanding of the invention, I have illustrated a preferred and desirable embodiment of the same in the accompanying drawings forming a part of this specification and throughout the various views of which like reference characters refer to the same parts.

In these drawings Figure 1 is a fragmentary elevation and partial section of an automobile truck embodying the features of my invention. Fig. 2 is an enlarged vertical cross-section through the appliance. Fig. 3 is a horizontal section through the device. Figs. 4 and 5 illustrate details of the conveyer adjusting mechanisms. Fig. 6 is a fragmentary, detailed section of the locking appliance of the conveyer in the cold storage compartment. Fig. 7 is a fragmentary elevation of the magazine and letter conveyers. Fig. 8 is a horizontal section on the line 8—8 of Fig. 7 with the guide bars omitted. Fig. 9 is a fragmentary, vertical section through the series of magazine holders and one series of letter holders. Fig. 10 is a detailed view, showing the manner of adjustment of the holders to the sprocket chains; and Fig. 11 is a perspective view of one of the letter holders or receptacles.

Before referring to the details of the structure and its mode of operation, it may preliminarily be remarked that the vehicle contains a plurality of conveyers adapted to accommodate letters, magazines, parcel post packages, both those requiring cold storage and others. The particular appliance illustrated is intended for use in post-office rural delivery service, and it will probably be found convenient to load the various conveyers from the rear of the vehicle and unload them from the front, the parcels and letters being arranged, when placed in or on their conveyers, so that they will be in proper order for delivery from the other ends of the conveyers. The postman may, if desired, receive mail at the same time that he is delivering and, under such circumstances, some of the conveyers would be used for the reception of such articles, probably at the front of the vehicle.

Having in mind the general objects of the invention, by reference to the drawings it will be apparent that this preferred form of embodiment of the invention comprises an automobile or motor truck 20, equipped with the usual operating and steering mechanism 21, and having a covered body 22. These, of course, may be of any usual or desired type and, in fact, the vehicle may be horse drawn, if preferred. Just above the bottom or floor 23 of the vehicle an endless conveyer 24 is provided for the accommodation of the heavier packages, such member extending practically the full length of the vehicle back of the seats and being mounted on sprocket wheels 25 on a pair of cross-shafts 26, revoluble in bearings 27 on upright rack bars 28, the constructions at both ends of the conveyer being substantially alike and, hence, not requiring detailed illustration and description.

In order to support the upper and lower stretches of the flexible transporter in unsagging or horizontal relation, at each side thereof I mount a stationary, apertured channel bar 29, with its flanges 30 and 31 presented inwardly, and on which travel rollers 32 secured at intervals to the conveyer and projecting laterally therefrom. To prevent the transported articles from falling from the conveyer, each of the channel bars has fastened to it a bent, sheet-metal guard 34 projecting a substantial distance above the top surface of the conveyer adjacent to its edge. This conveyer or carrier may be operated either from the rear of the vehicle, as, for example, when articles are being placed thereon, or, from the front of the automobile, when they are being removed therefrom. To permit this action, the rear shaft 26 has fixed thereto at each side an accessible hand-wheel 35, the turning of either one of which causes the actuation of the carrier. The front shaft 26 has mounted thereon a sprocket wheel 36, co-acting with a chain 37 encircling a sprocket wheel 38 on a jack-shaft 39, revoluble in bearings 40, 40, on the back of the chauffeur's seat 41, such shaft 39 being operatively connected by sprocket wheels 42 and 43 and a chain 44 to an operating hand-wheel 46 at one side of the seat 41. Obviously, by turning the handle 46, the conveyer may be made to travel and transport its lading in either direction.

The conveyer proper may be of any suitable structure, such as slats connecting together a pair of sprocket chains, or slats or strips hinged directly to one another. While I have indicated two end shafts for supporting and operating the carrier, it will be understood that any appropriate number of intermediate shafts with suitable bearings may be also employed, if desired. Above the conveyer 24, on each of the vertical rack bars 28 (six in the present instance), there is slidingly mounted a block 47 provided with a pair of apertured, spaced arms 48, affording bearings for a transverse shaft, three of the latter, 49, 50 and 51, being used in the present device. Each of such shafts has revolubly mounted thereon, at one end, a sleeve 52ª carrying a gear 52, accommodated between the arms 48 and in mesh with the teeth of the corresponding rack bar 28. Each of the members 47, at one side of the vehicle, also has a projecting bearing 53, such three alined or registering bearings receiving a longitudinally disposed shaft 54, equipped at each end with a squared part 55 for the temporary accommodation of the turning handle. Shaft 54 has secured thereto three bevel gears 56, each in mesh with a similar gear 57 on the end of one of the sleeves 52ª of the cross-shafts.

It should be clear from this illustration and description that the two parallel endless conveyers 58 and 59 mounted upon such cross-shafts can, by merely turning shaft 54, be vertically adjusted toward or from the lower carrier 24, without disturbing their required horizontal disposition, in this way so positioning the carriers that they may receive packages of various sizes and without conflict with one another, the maximum capacity of the vehicle being maintained at all times with due regard to the sizes and shapes of the packages. These three cross-shafts, 49, 50 and 51, support pairs of angle bars 60, 61, 62 and 63, with the flanges of each pair extended toward one another, as shown in Fig. 2. Each of the endless conveyers 58 and 59 is carried on sprocket wheels 64 and 65 fixed on shaft 49, 50 or 51, as the case may be, the front or rear shafts extending outwardly between the angle bars and being supplied with a turning hand-wheel 67. These carriers are also provided with rollers 68 traveling on the upper and lower flanges respectively of the corresponding angle bars. To the latter package-retaining, sheet-metal guides 70 are secured. By turning the hand wheel 67 of either the front or rear shaft, either of the companion carriers may be actuated in either direction. Above carriers 58 and 59 there is another pair of conveyers 71 and 72, in structure and mode of operation like the underlying carriers and, if desired, one of these may be provided with one or more small hammocks for the safe transportation of fragile articles. The carriers 71 and 72 are adjustably mounted on the rack bars already described and are capable of adjustment in the manner set forth in connection with the lower carriers 58 and 59. As is usual in vehicles of this general character, the back of the same may be closed by doors 73, capable of being locked for the safe keeping of the goods on the conveyers.

Beneath the floor of the vehicle and at its rear portion a depending cold storage compartment 74 is provided, having a rear, hinged door 75, which may be closed and locked. This chamber contains an ice pan 76, above which are two endless, apertured carriers 77, 77ª, on sprocket wheels 78, on shafts 79 and 80, each of the latter projecting through a side wall of the compartment and having its extended end supplied with a handle 81, 81ª, by which the conveyer may be operated. To prevent the unauthorized manipulation of the carrier when the compartment is closed, the door 75 has mounted thereon a pair of lugs 82 (Fig. 6), positioned to fit between teeth of a pair of sprocket wheels in the closed position of the door, thereby locking the conveyers against actuation. Two conveyers are used in this compartment, so that one may be employed for the delivery of goods therefrom, while the other is used for the reception of goods received during such delivery; that is to say, the mail-carrier, when the appliance is used in the postal service, may be delivering packages from the one conveyer in the compartment, and receiving from those living along the route articles requiring refrigeration, which are placed on the other conveyer. As will be readily understood, the carriers 24, 58, 59, 71 and 72 are intended to receive minor parcels of varying sizes, and the conveyers or movable holders 77 77ᵃ are adapted to similarly accommodate perishable goods subjected to the cooling action of the ice in tray 76. The vehicle is also intended to facilitate the handling of letters and magazines, and to these parts of the structure I will now refer.

By reference to Fig. 2, it will be noticed that the upper portion of the vehicle body is wider than its lower part and these two side, overhanging sections are utilized for the housing of the superposed letter and magazine endless carriers. On each side of the vehicle, just inside its side wall, one continuous magazine carrier 83 is employed, above which four superposed letter conveyers 84, 85, 86 and 87, are mounted. Inasmuch as the constructions at the two sides of the vehicle are alike, it will suffice to describe only one of them. At the side of the automobile there are two upright posts 88 and 89, each of which, near its lower end, has fastened thereto, by a set screw 90, an arm 91, equipped with a vertical bearing 92, and having its upturned end 93 bifurcated at 94 for the reception of a deflector or guide 95, pivoted to the arm at 96 at one side of its center, its longer portion having an upstanding lug 97 on its upper face. As is clearly illustrated, the arm 91 of the front post 88 projects forwardly, the corresponding arm of the back post 89 extending rearwardly. The front bearing 92 accommodates a short, vertical shaft 98 carrying an upper horizontal sprocket wheel 99 and another sprocket wheel 100 below the bearing. Similarly the rear bearing 92 has a short shaft 101 equipped with a sprocket wheel 102, coacting with which and the companion wheel 99 is a magazine-carrier sprocket chain 103. That is to say, the chain is provided with a plurality of sheet-metal, vertically disposed receptacles 104, open at their tops at 105 and apertured or provided with windows 106 in their front faces for the display of the addresses of the magazines therein. At suitable intervals, the chain 103 has specially formed links 107 (Fig. 10), each accommodating a roller 108 mounted in its lower portion and each also having integral or rigid therewith a vertical, cylindrical rod or shaft 109, which has pinned to it a collar 110 provided on its upper face with two tapered lugs 111, spaced 180° apart. Each of the receptacles or holders 104 has a bearing member 112 secured to its rear face, such member accommodating the rod 109 and bearing provided on its lower edge with two tapered or V-shaped cavities 113, 180° apart, and adapted to receive the lugs 111. Interposed between the top of the bearing member 112 and a collar 114 held to the rod 109 by a cotter pin 115 is a spring 116, which, as will be readily understood, yieldingly holds the bearing 112 down on the member 110, permitting turning of the rod, however, in the bearing when required. The rollers 108 travel on suitably supported angle bar tracks 117, preventing sagging of the chains and the holders carried thereby. At its upper part, each holder has fastened thereto a block 118, acting as a bearing for the upper portion of the rod 109, and the top part of the rod has a block 119 fixed thereto, carrying two concave-faced rollers 120, 120, which travel on opposite sides of the horizontally disposed, cylindrical bars or rods 121. On its lower face, each of these boxes or magazine holders 104 is supplied with a cam lug 122, adapted to coöperate, as explained below, with the levers 95, as the box reaches the ends of its path of travel, so as to control the operation of the stops or guides 97. Sprocket wheel 100, at the front of the vehicle, by means of a coöperating sprocket chain 123 is operatively connected to a companion sprocket wheel 124 mounted on a bracket 125 at the side of the seat 41 and equipped with a turning handle 126. The rear sprocket wheel 101 is provided with a hand-wheel 127. Obviously, by turning either of the handles 126 or 127, the conveyer may be operated from either the front or the rear of the vehicle to render the magazine holders successively accessible.

It will be observed from the drawings that these magazine or newspaper holders always face inwardly of the vehicle, even though attached to and operated by an endless chain. Stated somewhat differently, the magazine or newspaper boxes or receptacles do not turn around as they reach the end of their travel, but always maintain the same general disposition, that is to say, they always face inwardly. This result is accomplished by the mechanism described, which operates substantially as follows: When any one of the boxes or holders 104 approaches the end of its travel, its cam-lug 122 engages the end of lever 95, rocking such lever so as to bring the stop 97 into the path of travel of the box as it passes around the sprocket wheel, in this way preventing the box from turning around. But, of course, since the rod 109 of the chain turns as it passes around the sprocket wheel and the cam-catch 110 turns with it, the box will be raised slightly by the action of the parts 111 and 113, and when the rod has turned 180° relatively to the box, the latter will again settle into normal position with the teeth 111 in the notches 113, in this way always maintaining the box parallel to the strands of the chain. At the proper time, the cam 122 frees the end of lever 95 and stop 97 drops out of the way, permitting the box to continue its travel with the chain. Concisely stated, the boxes at the ends of their travel are temporarily held from rotation, while that portion of the chain to which they are attached passes around the sprocket wheel. This action is clearly illustrated in Fig. 8. On the posts or rods 88 and 89, above these magazine or newspaper carriers, there are positioned a plurality of letter carriers or conveyers, four on each side, designated 84, 85, 86 and 87. As is clearly shown in Fig. 2, in each overhanging portion of the vehicle body there is mounted one magazine or newspaper carrier and above this the four superposed letter carriers, or conveyers. These latter receptacles are much like the magazine holders, except that they do not have the wheels 120, the rod 121 or the top bearing 118, the rods 131 (Fig. 9) of their chains being somewhat shorter. Otherwise the mounting and operation of these latter boxes or receptacles is the same as that for the magazine carriers. Each of these letter receptacles 132 is of sheet-metal and is provided with a display window 133. Internally each of these boxes accommodates a plate 134 pressed toward the window by a bow spring 135. As is indicated in Fig. 9, the top edge portions of the box and the plate 134 are flared or diverged, and the letter, postal card, or the like, is intended to be received between the windowed wall and the plate 134, thus being securely held in position with its address displayed through the window. As is shown in perspective in Fig. 11, the front face of each of these letter holders or boxes is equipped with a plurality of rockable flags or signals 136, 137, 138, 139, 140 and 141. Each of these is mounted on its own individual shaft 142, having a handle 143, the shaft being rockingly accommodated in the bearing of a suitably shaped bar or strap 144.

Assuming that this novel form and construction of vehicle is being used in rural delivery service, when the vehicle is being loaded the signals of the letter boxes or receptacles are manipulated so as to indicate upon which conveyers the addressee of the letter in that particular box has other articles to be delivered. For example, let us assume that John Doe has a letter, a magazine, a box and a pound of butter to be delivered to him. Then, when these articles are placed in the vehicle, the signals on the letter box will be turned so as to show that there is a magazine in the magazine conveyer, a parcel on the middle of the three carriers in the central portion of the vehicle, and some form of package in the cold storage compartment. Of course, if there is a letter only to be delivered, none of these signals will be operated, and if, in addition to the letter, there is only one parcel, the signal corresponding to the conveyer on which that parcel has been deposited will be turned to indicate its presence in the vehicle. For the satisfactory handling of long articles, such as umbrellas, canes and the like, I provide on the under face of the roof a net 145 (Fig. 2), which has its edges securely fastened to the roof in any approved manner.

It has been indicated above that the vehicle has a chauffeur's seat 41, and opposite this I provide another seat 146 (Fig. 3), with a folding back 147, which may be turned down and employed as a table, facilitating the handling of the articles being delivered or received. In case it is desired to wall off the chauffeur, who possibly might not be an employee of the postal department, I provide two mesh screens 148 and 149, one between the seats and one back of the seat 41. These screens are adapted to be rolled up upon and unrolled from rollers 150 and 151 at the top of the truck, and when drawn down into operative position they are locked in place in any approved manner. Under these circumstances, a chauffeur may operate the vehicle while the mail-man occupying the seat 146 attends to the delivery and receipt of goods. In front of the latter, at the dashboard, there may be supplied, if desired, scales 152 and a safe 153, the latter being detachably locked in place so that it can be readily removed for the balancing of accounts.

In case it is desired to receive letters, and in order to facilitate their distribution, I provide on either or both sides of the vehicle, between the wheels and below the over-hanging portion of the body, compartments 154, with doors and apertures 155, these chambers being intended for mail pouches, into which the letters are dropped through the apertures. By providing a number of these pouches and having the compartments suitably marked, as indicated, for example, in Fig. 1, the mail thus received will be distributed and ready for shipment as soon as the incoming vehicle reaches the post-office or railway station.

In ordinary operation, the mail-man will deposit the various letters, magazines, papers and packages in or on the various carriers or conveyers from the rear of the vehicle, advancing these progressively by means of their various operating handles described. These articles will, of course, be placed on the conveyers in the order of delivery on the route. Then, in delivering these various articles, preferably from the front of the vehicle and while occupying one of the two seats, the operator advances these various conveyers or carriers as their contents are gradually unloaded, so that on each carrier the next article to be delivered will always be in front and within easy reach of either of the two seats. Of course, if preferred, the articles may be delivered from the rear of the vehicle and placed on conveyers from the front, and in some instances it will be preferable to reserve some of the conveyers for the reception of articles received during the delivery of the others. That is to say, those persons living on the rural delivery route may mail their letters or parcel post packages by giving them to the postman, who would place them upon the proper carriers. For example, the conveyer 58 might be advanced forwardly during the delivery of its contents, while the conveyer 59 might be gradually moved rearwardly as it receives its various packages.

The details of this construction are not essential and many minor mechanical changes may be made in the structure without departing from the substance and essence of the invention and without the sacrifice of any of its substantial benefits and advantages.

It may be found preferable to construct the conveyer 24 of perforated metal for holding the heavier articles transported and to make the other conveyers, 58, 59, 71 and 72, of lighter material, such as canvas, for holding articles of less weight. In any case, it is desirable for the conveyers in the refrigerated compartment to be apertured or perforated to facilitate the passage of air currents.

I claim:

1. In a structure of the character described, the combination of a vehicle, a plurality of superposed endless conveyers longitudinally disposed in the central portion of the vehicle body, a plurality of endless superposed conveyers arranged longitudinally of, inside of, and adjacent the side-wall of the vehicle body and each equipped with a plurality of vertically-arranged holders, and means to operate said conveyers, the planes of said central and side conveyers being at right angles to one another, said central conveyers being adapted to accommodate heavier and bulkier articles than the holders of said side conveyers, substantially as described.

2. In a structure of the character described, the combination of a vehicle, a plurality of superposed conveyers longitudinally disposed in the central portion of the vehicle body, a plurality of endless superposed conveyers arranged longitudinally of, inside of, and adjacent the side-wall of the vehicle body and equipped with a plurality of vertically-arranged holders, means to operate said conveyers, and means to maintain said holders facing always inwardly of the vehicle, said central conveyers being adapted to accommodate heavier and bulkier articles than the holders of said side conveyers, substantially as described.

3. In a structure of the character described, the combination of a vehicle, a plurality of conveyers therein, means adapted to operate said conveyers to advance the articles thereon, and means on one of said conveyers adapted to indicate the contents of one or more of the others, substantially as described.

4. In a structure of the character described, the combination of a vehicle, a compartment on said vehicle, a conveyer in said compartment, means to operate said conveyer from the outside of the vehicle, a door for said compartment, and means controlled by the door to lock and unlock the conveyer, substantially as described.

5. In a structure of the character described, the combination of a vehicle, a compartment on said vehicle, means associated with said compartment adapted to contain a refrigerating element, a conveyer in said compartment, means to operate said conveyer from the outside of said compartment, a door for said compartment, and means controlled by the door to lock and unlock the conveyer, substantially as described.

6. In a structure of the character described, the combination of a vehicle body having an over-hanging side portion, a plurality of superposed conveyers in said over-hanging portion, an equipment outside of said body below said over-hanging portion for the accommodation of one or more sacks for the reception of articles, substantially as described.

7. In a structure of the character described, the combination of a vehicle, a plurality of conveyers in said vehicle, means to operate said conveyers, and a pair of seats at the front of the vehicle, one of said seats having a folding back which, when turned down, constitutes a table, substantially as described.

CHARLES L. TALBOT.

Witness:
WALTER M. FULLER.

Copies of this patent may be obtained for five cents each, by addressing the "Commissioner of Patents, Washington, D. C."